United States Patent [19]

Komeya et al.

[11] 4,428,916
[45] Jan. 31, 1984

[54] METHOD OF MAKING α-SILICON NITRIDE POWDER

[75] Inventors: Katsutoshi Komeya, Yokohama; Hiroshi Inoue, Kawaguchi; Shigeru Matake; Hiroshi Endo, both of Yokohama, all of Japan

[73] Assignee: Tokyo Shibaura Electric Company Limited, Kawasaki, Japan

[21] Appl. No.: 79,231

[22] Filed: Sep. 26, 1979

Related U.S. Application Data

[63] Continuation of Ser. No. 878,452, Feb. 16, 1978, abandoned.

[30] Foreign Application Priority Data

Feb. 18, 1977 [JP] Japan .................................. 52-16037

[51] Int. Cl.$^3$ ........................................... C01B 21/068
[52] U.S. Cl. ..................................... 423/344; 423/406
[58] Field of Search ................................ 423/344, 406

[56] References Cited

U.S. PATENT DOCUMENTS

| 3,591,337 | 7/1971 | Lumbey ............................. 423/344 |
| 3,839,341 | 10/1974 | Lumbey et al. ...................... 423/344 |
| 3,855,395 | 12/1974 | Cutler ................................. 423/344 |
| 3,937,792 | 2/1976 | Lumbey ............................. 423/344 |

FOREIGN PATENT DOCUMENTS 51-28598  3/1976  Japan .
51-48799  4/1976  Japan .
52-38500  3/1977  Japan .

OTHER PUBLICATIONS

Korneya et al., "J. Mat. Sci." 10, 1243–1246, 1975.

*Primary Examiner*—Jack Cooper
*Attorney, Agent, or Firm*—Finnegan, Henderson, Farabow, Garrett & Dunner

[57] ABSTRACT

α-Silicon nitride powder which is used as a raw material for the preparation of high strength silicon nitride with additives such as magnesia and yttrium oxide, and other sintered materials suitable for high temperatures gas turbine engine components and the like, is prepared by heating a powdered mixture of silica, carbon and at least one component selected from the group consisting of silicon nitride, silicon carbide and silicon oxynitride in a nitrogen containing atmosphere and then optionally subjecting the material to a heat treatment in an oxidizing atmosphere for decarbonization of said material as required.

15 Claims, No Drawings

METHOD OF MAKING α-SILICON NITRIDE POWDER

This is a continuation of application Ser. No. 878,452 filed 2/16/78, now abandoned.

BACKGROUND OF THE INVENTION

1. Field of the Invention

The present invention relates to a method for preparing α-Si$_3$N$_4$, that is, the alpha form of silicon nitride, and more particularly to α-Si$_3$N$_4$ powder of high quality which is obtained in a high yield and a consistent yield.

2. Description of the Prior Art

It is known that sintered silicon nitride-yttrium oxide or magnesium oxide (Si$_3$N$_4$-Y$_2$O$_3$ or Si$_3$N$_4$-MgO) materials possess excellent mechanical strength and heat resistance, and therefore have been used in high temperature gas turbine engines. However, when the conventional Si$_3$N$_4$ sintered products are used in practice as materials which are subjected to high temperatures and high stresses, their physical and chemical stabilities and reliability at high temperatures are absolutely essential requirements. Their thermal and mechanical properties, which are particularly important factors, are greatly affected by the nature of the starting materials and the quantities of impurities which these materials contain. Moreover, with regard to the silicon nitride it is desirable that it should contain as much α-Si$_3$N$_4$ powder as possible. Especially desired is a finely divided α-Si$_3$N$_4$ powder for use in sintering materials.

In the past, Si$_3$N$_4$ powder has been synthesized by the following methods.

(1) $3Si + 2N_2 \rightarrow Si_3N_4$ (2) A vapor phase reaction in which silicon tetrachloride or silane is reacted with ammonia as starting materials $3SiCl_4 + 4NH_3 \rightarrow Si_3N_4 + 12 HCl$, and the like;

(3) A method of nitridizing SiO$_2$ obtained by reducing silica (SiO$_2$) with carbon in the following stoichiometric ratio $3SiO_2 + 6C + 2N_2 \rightarrow Si_3N_4 + 6CO$, and the like.

In the case of method (1), the nitridization of Si is an exothermic reaction, and therefore the process must be carefully conducted so as to carefully control the generation of heat. For example, the Si which is commercially selected for the reaction is comparatively coarse-grained powder, and therefore, fine grinding is generally conducted after nitridization. Therefore, the admixture of impurities into the product during the grinding process is unavoidable, and although there is no objection to the use of this material for refractory materials in general, such as firebricks, it is not suitable for high temperature gas turbines.

The process of reaction (2) yields a product which is suitable, for instance, for the surface coating of semiconductor elements and the like, but it cannot be regarded as suitable for the mass production of inorganic refractory materials.

In the case of reaction (3) thoroughly purified SiO$_2$ powder and carbon (C) powder must be used as starting materials, and there is also the disadvantage that the product produced by reacting stoichiometric quantities of SiO$_2$ and C comprises a mixed system of α-Si$_3$N$_4$, β-Si$_3$N$_4$ (beta form of silicon nitride), silicon oxynitride (Si$_2$ON$_2$), silicon carbide (SiC) and the like. Moreover, the yield of α-Si$_3$N$_4$ is low. In other words, this reaction system has the advantage that the reaction procedure is relatively easy, but the yield of α-Si$_3$N$_4$ product is low, and therefore the method is not preferred in practice.

A need, therefore, continues to exist for a method by which high quality α-silicon nitride can be manufactured in high and consistent yield.

SUMMARY OF THE INVENTION

Accordingly, one object of the present invention is to provide a method of manufacturing high quality α-silicon nitride in high and consistent yield.

Another object of the invention is to provide a high quality α-silicon nitride.

Still another object of the invention is to provide a high quality α-silicon nitride powder which is suitable for use as refractory material in high temperature and high stress environments.

Briefly, these objects and other objects of the present invention as hereinafter will become more readily apparent can be attained by providing a method of manufacturing α-silicon nitride which comprises the step of heating a powdered mixture of 1 wt. part silica, 0.4–4 wt. parts carbon and 0.005–1.0 wt. part of at least one component selected from the group consisting of silicon nitride, silicon carbide and silicon oxynitride at from 1350° C. to 1550° C., preferably from 1400° C. to 1500° C. in a non-oxidizing atmosphere containing at least one of nitrogen or ammonia, such that reduction and nitridization reactions occur which produce silicon nitride, and optionally heating said silicon nitride at from 600° C. to 800° C. in an oxidizing atmosphere to effect decarbonization after said nitridization.

DESCRIPTION OF THE PREFERRED EMBODIMENTS

The essential feature of the discovery of the present invention is that if in the reduction and nitridization of silica (SiO$_2$), the quantity of carbon (C) which is used is a quantity equal to or somewhat in excess of the amount needed to reduce SiO$_2$ and if a specified quantity of at least one component selected from the group consisting of silicon nitride, silicon carbide and silicon oxynitride is also present, and the nitridizing reaction, and as required, a heat treatment under an oxidizing atmosphere are conducted at specified temperatures, then α-Si$_3$N$_4$, that is, the alpha form of silicon nitride, of high quality, and which is extremely fine-grained, can be produced in high yield. Furthermore, the yield which is obtained is consistent even if impurities are contained in the starting material, such as Fe or Fe compounds in the carbon powder.

The present invention involves a method of manufacturing α-silicon nitride (α-Si$_3$N$_4$) powder, characterized in that a mixture of powdered reactants, in which the ratio proportions of the reactants by weight are 1 part silica (SiO$_2$) powder, 0.4 to 4 parts carbon (C) powder and 0.005 to 1.0 parts of at least one component selected from the group consisting of silicon nitride, silicon carbide and silicon oxynitride (Si$_3$N$_4$, SiC and/or Si$_2$ON$_2$) powder, is heated and fired at 1350° to 1550° C., under a nonoxidizing atmosphere containing at least one of nitrogen or ammonia, wherein reduction and nitridization reactions take place and silicon nitride is produced. Thereafter, the product obtained is optionally subjected to a further heat treatment in an oxidizing atmosphere such as air, preferably at 600° to 800° C. as required. In the invention, the term carbon includes higher hydrocarbons. Suitable sources of carbon for the method of the invention include carbon powders such as carbon black, and hydrocarbon materials such as naphthalene, anthracene, and the like.

In the silica-carbon-silicon nitride, silicon carbide and/or silicon oxynitride ($SiO_2$-C-$Si_3N_4$, SiC and/or $Si_2ON_2$) mixture used as the starting material in the present process, the preferred $SiO_2$:C:$Si_3N_4$, SiC and/or $Si_2ON_2$ weight ratio is selected as 1:0.4 to 4:0.005 to 1.0 for the following reasons. If less than 0.4 part of C is used to 1 part of $SiO_2$, then a large quantity of $Si_2ON_2$ is formed and the quantity of the α-silicon nitride produced is small and some unreacted $SiO_2$ remains. If necessary, the $SiO_2$ containing silicon nitride may be prepared. On the other hand, if more than 4 parts of C are used per 1 part of $SiO_2$, then β-$Si_3N_4$, that is, the beta form of silicon nitride, is produced and as a result the purity and the yield of the α-silicon nitride are reduced. Furthermore, if less than 0.005 part of $Si_3N_4$, SiC and/or $Si_2ON_2$ is used per part of $SiO_2$, the effect upon increasing the yield of α-silicon nitride is inadequate. On the other hand, if more than 1.0 part of $Si_3N_4$, SiC, and/or $Si_2ON_2$ is used per part of $SiO_2$, the precess becomes too uneconomical. In this case large amounts of added powders are contained in the products and the preferred silicon nitride powder is not necessarily obtained.

The $SiO_2$, C and $Si_3N_4$, SiC and/or $Si_2ON_2$ starting materials preferably are of high purity of at least 99%. $SiO_2$ may include silica formed by heat treatment. Moreover, concerning grain sizes, $SiO_2$ and C preferably have an average grain diameter not greater than 1 μm and $Si_3N_4$, SiC and/or $Si_2ON_2$ have an average grain diameter not greater than 2 μm preferably 0.5 μm. Small grain sizes of starting materials are preferable in the process. When silicon nitride is used as starting material for manufacturing α-$Si_3N_4$ powder, it is preferably relatively pure in comparison with the SiC or $Si_2ON_2$ used the process. The silicon nitride starting material may contain metallic silicon as an impurity and may include amorphous or non-crystalline silicon nitride.

When the starting materials are $SiO_2$-C-$Si_3N_4$, the $Si_3N_4$ may be either the alpha or the beta form, but the alpha form is preferred. It is also acceptable to use $Si_3N_4$ which contains minor amounts of other elements such as Aluminum or Oxygen in solid solution.

In the heating and firing of the $SiO_2$-C-$Si_3N_4$, SiC and/or $Si_2ON_2$ mixture in the process of the present invention, the atmosphere over the reactants can be $N_2$, $NH_3$, $N_2$ and hydrogen ($H_2$), $N_2$ and an inert gas such as Ar, He or the like, but the main reaction gas constituent must be at least one of $N_2$ or $NH_3$. The reason for this is that it has been confirmed experimentally that at least one of these gaseous materials is necessary to realize the desired great effect on the production of highly pure α-$Si_3N_4$. The heating and firing temperatures used in the process of the invention under this atmosphere in which the main reaction gas is $N_2$ and/or $NH_3$ is selected within the range from 1350° to 1550° C. The reason for this is that if the temperature employed is less than 1350° C., $Si_3N_4$ is not formed readily. If the temperature exceeds the upper limit, excessive formation of SiC occurs, and the required α-$Si_3N_4$ powder suitable for materials which are to be used under high temperatures and high stresses cannot be obtained in adequate yield and purity.

Also, after the silicon nitride product is heated and fired in an atmosphere in which the main reaction gas is $N_2$ or the like, a heat treatment under an oxidizing atmosphere such as air is advantageously conducted for the purpose of removing the residual carbon. The temperature of this treatment is selected within the range of 600° to 800° C. Temperatures in excess of 800° C. tend to result in oxidation of the $Si_3N_4$ and decreased yields, while temperatures below 600° C. are inadequate to efficiently remove carbon.

If, as described above, the reduction and nitridization of $SiO_2$ by the present invention is employed, in which an excess of carbon well above the stoichiometric amount is used, and a specific quantity of $Si_3N_4$ is also present, then the reduction of the $SiO_2$ is substantially promoted. Also, the added $Si_3N_4$ serves as nuclei for smooth crystal growth of subsequently formed product and α-$Si_3N_4$ powder of high quality, containing a large quantity of α-$Si_3N_4$, is obtained in good yield.

When the method of the present invention is used, α-$Si_3N_4$ powder suitable for making silicon nitride sintered materials which are required to withstand high temperatures and high stresses, is easily obtained. The reason for this method is believed to be as follows. The primary reaction which occurs is the reduction of silica by carbon, $SiO_2+C\rightarrow SiO+CO$. This reaction is a solid phase reaction, and when the C/$SiO_2$ ratio is high, the reaction becomes relatively rapid and the SiO which is produced reacts with the $N_2$ or $NH_3$ more easily. In this reaction the SiO and the $N_2$ or $NH_3$ may be present in the vapor state, and therefore it may be said that the proportion of carbon that is present governs the reduction and nitridization reactions of the SiO. In this instance, if the quantity of carbon is lower than the stoichiometric amount, $Si_2ON_2$ is formed, and the conversion of $Si_2ON_2$ to α-$Si_3N_4$ becomes extremely difficult. However, as described above, the quantity of carbon is greatly in excess compared to the stoichiometric amount, and it appears that for this reason the formation of $Si_2ON_2$ is inhibited and α-$Si_3N_4$ is easily formed.

The presence of a large excess of carbon gives rise to the smooth production of α-$Si_3N_4$. However, on the other hand, the presence of carbon may also result in the admixture of other impurities in the product which were present in the C powder used as a starting material. The α-$Si_3N_4$ content of the product might ordinarily become relatively low as a result. But in an embodiment of the present invention, a specified quantity of $Si_3N_4$ powder is also present in the reaction. In the production of $Si_3N_4$ by an oxide-reduction reaction, the aforementioned SiO, $N_2$, $NH_3$, and the like are present in the vapor state. Once $Si_3N_4$ in the solid state is formed, it facilitates further growth thereafter and influences the reaction speed and yield ratio. However, in the present invention, the $Si_3N_4$ powder which is added beforehand operates as nuclei for further growth and formation of solid $Si_3N_4$. Moreover, the amount of SiO vapor is reduced as a consequence of crystal growth of $Si_3N_4$, which contributes significantly to the improved purity of the $Si_3N_4$ produced. Further, even if impurities are present in the reaction system, for example from Fe compounds present in the carbon powder, α-$Si_3N_4$ is still obtained in consistently high yield.

Thus, in the present invention an α-$Si_3N_4$ powder is obtained which is of high quality and which contains a high content of α-$Si_3N_4$. Moreover, the nitride contains only small quantities of SiC and other impurities. Thus, the method of the present invention is suitable for making $Si_3N_4$ powder which is suitable as a raw material for the preparation of sintered structural materials which are required to withstand high temperature and high stresses, for instance, for gas turbine engine components.

high quality α-Si$_3$N$_4$ powder with about 95% α-Si$_3$N$_4$ content was produced in each case.

TABLE 1

| materials | Composition (weight ratio) SiO$_2$ | C | Si$_3$N$_4$ | Reaction Conditions Temp. (°C.) | T (hr) | Atmosphere | Characteristics of Produced Powder S (μm) | N (%) | α-Si$_3$N$_4$ (%) | SiC (%) | Impurities (%) |
|---|---|---|---|---|---|---|---|---|---|---|---|
| 1 | 1 | 2 | 0.1 | 1400 | 5 | N$_2$ | 1.2 | 37.7 | 95 | 0.3 | 0.09 |
| 2 | 1 | 2 | 0.01 | 1400 | 5 | N$_2$ | 1.1 | 35.1 | 96 | 0.3 | 0.09 |
| 3 | 1 | 2 | 0.005 | 1400 | 5 | N$_2$ | 1.7 | 34.2 | 94 | 0.3 | 0.09 |
| 4 | 1 | 2 | 1.0 | 1400 | 5 | N$_2$ | 1.4 | 37.0 | 90 | 0.41 | 0.12 |
| 5 | 1 | 4 | 0.1 | 1400 | 5 | N$_2$ | 1.1 | 37.5 | 96 | 0.22 | 0.13 |
| 6 | 1 | 0.4 | 0.1 | 1400 | 5 | N$_2$ | 1.1 | 36.0 | 95 | 0.2 | 0.06 |
| 7 | 1 | 2 | 0.1 | 1380 | 5 | N$_2$ | 1.2 | 36.1 | 95 | 0.28 | 0.08 |
| 8 | 1 | 2 | 0.1 | 1450 | 5 | N$_2$ | 1.5 | 37.9 | 94 | 0.32 | 0.11 |
| 9 | 1 | 2 | 0.1 | 1400 | 5 | N$_2$ + H$_2$ | 1.1 | 35.7 | 96 | 0.26 | 0.10 |
| 10 | 1 | 2 | 0.1 | 1400 | 5 | NH$_3$ | 1.2 | 38.0 | 95 | 0.28 | 0.10 |
| 11 | 1 | 2 | 0.1 | 1400 | 5 | N$_2$ + Ar | 1.2 | 36.3 | 94 | 0.28 | 0.08 |
| 12 | 1 | 2 | 0.1 | 1480 | 2 | N$_2$ | 1.2 | 37.5 | 96 | 0.29 | 0.10 |
| 13 | 1 | 0.4 | 0.1 | 1510 | 3 | N$_2$ | 1.0 | 37.5 | 92 | 0.5 | 0.08 |
| a | 1 | 2 | — | 1400 | 5 | N$_2$ | 1.7 | 14.2 | 90 | 0.1 | 0.11 |
| b | 1 | 4 | — | 1400 | 5 | N$_2$ | 1.5 | 21.2 | 91 | 0.25 | 0.17 |
| c | 1 | 0.4 | — | 1400 | 5 | N$_2$ | 1.5 | 9.2 | 90 | 0.22 | 0.15 |
| d | — | — | 1.0 | 1400 | 5 | N$_2$ | 1.0 | 38.0 | 70 | — | 0.01 |

INDEX OF TABLE 1
SiO$_2$ = silica powder
C = carbon powder
Si$_3$N$_4$ = silicon nitride powder
temp. = temperature during reaction treatment (centigrade)
T = time during reaction treatment (hours)
S = average grain diameter (micrometer)
N = nitrogen content (weight percent)
α-Si$_3$N$_4$ = α-Si$_3$N$_4$ content (weight percent)
SiC = SiC content (weight percent)
impurities = other metallic impurities (weight percent)

Having generally described the invention, a more complete understanding can be obtained by reference to certain specific examples, which are included for purposes of illustration only and are not intended to be limiting unless otherwise specified.

EXAMPLE 1

A SiO$_2$ powder having an average grain diameter of 13 mμm, C (carbon black) powder having an average grain diameter of 29 mμm and Si$_3$N$_4$ powder having an average grain diameter of 1.0 μm were mixed in the proportions (parts by weight) shown in Table 1 to form 17 samples of powdered materials (including the reference examples).

The powdered mixtures were heated and fired at 1350° to 1550° C. for 2 to 5 hours under a N$_2$, N$_2$-H$_2$, N$_2$-Ar or NH$_3$ atmosphere, and then subjected to a heat treatment under an air atmosphere at 700° C. for 8 hours, and Si$_3$N$_4$ containing powders were thus obtained.

For each of the Si$_3$N$_4$ containing powders thus obtained, the average particle size(S), the nitrogen content (weight %), the α-Si$_3$N$_4$ content (weight %), which was confirmed by X-ray diffraction patterns, the SiC content (weight %) and the quantities of Si$_3$N$_4$ and other metallic impurities (weight %) were determined in each case and the results are all shown in Table 1. In Table 1, specimens 1 to 13 represent embodiments of the present invention, and specimens a to d represent reference examples.

EXAMPLES 2-3

An alternative embodiment was produced by replacing the Si$_3$N$_4$ powder of Example 1 as starting material by SiC powder having a particle size of 0.8 μm, and yet another embodiment by replacing the Si$_3$N$_4$ powder by Si$_2$ON$_2$ powder having a particle size of 1.5 μm. These were treated under the same conditions and using the same volumes of materials as Nos. 1 to 4 in Table 1. A Having fully described the invention, it will be apparent to one of ordinary skill in the art that many changes and modifications can be made thereto without departing from the spirit or scope of the invention as set forth herein.

What is claimed as new and intended to be secured by Letters Patent is:

1. A method of manufacturing α-silicon nitride which comprises the steps of:
   (a) premixing 1 wt. part silica powder, 0.4–4 wt. parts carbon powder and 0.005–1.0 wt. part of at least one powder component selected from the group consisting of silicon nitride, silicon carbide and silicon oxynitride; and
   (b) heating said mixture at from 1350° C. to 1550° C. in a non-oxidizing atmosphere containing at least one of nitrogen or ammonia, for a time sufficient to effect the formation of α-silicon nitride.

2. The method of claim 1, which further comprises the step of heating said α-silicon nitride at from 600° C. to 800° C. in an oxidizing atmosphere to effect decarbonization.

3. The method of claim 1, wherein said component is silicon nitride.

4. The method of claim 3, wherein said silicon nitride is α-silicon nitride.

5. The method of claim 1, wherein said non-oxidizing atmosphere is N$_2$ gas.

6. The method of claim 1, wherein said non-oxidizing atmosphere is NH$_3$ gas.

7. The method of claim 1, wherein said non-oxidizing atmosphere is a mixture of N$_2$ and H$_2$ gas.

8. The method of claim 1, wherein said non-oxidizing atmosphere is a mixture of N$_2$ and Ar gas.

9. The method of claim 2, wherein said oxidizing atmosphere is air.

10. The method of claim 1, wherein said component is silicon carbide.

11. The method of claim 1, wherein said component is silicon oxynitride.

12. The method of claim 1, wherein said silica and said carbon have an average grain diameter not greater than 1 μm.

13. The method of claim 1, wherein said component has an average grain diameter not greater than 2 μm.

14. The method of claim 13, wherein said component has an average grain diameter not greater than 0.5 μm.

15. The method of claim 1, wherein said component has a purity of at least 99%.

* * * * *